March 28, 1961 W. J. TILTON ET AL 2,977,035
COMPENSATING MEANS FOR WEB FEEDER
Filed Dec. 18, 1957 7 Sheets-Sheet 1

INVENTORS.
WILLIAM J. TILTON
AND KENNETH N. MOORE,
BY
Allen & Allen
ATTORNEYS.

INVENTORS.
WILLIAM J. TILTON
AND KENNETH N. MOORE
BY
ATTORNEYS.

W. J. TILTON ET AL 2,977,035

COMPENSATING MEANS FOR WEB FEEDER

Filed Dec. 18, 1957

INVENTORS.
WILLIAM J. TILTON
AND KENNETH N. MOORE,
BY
Allen & Allen
ATTORNEYS.

March 28, 1961   W. J. TILTON ET AL   2,977,035
COMPENSATING MEANS FOR WEB FEEDER
Filed Dec. 18, 1957   7 Sheets-Sheet 6

INVENTORS.
WILLIAM J. TILTON
AND KENNETH N. MOORE,
BY
ATTORNEYS.

United States Patent Office 2,977,035
Patented Mar. 28, 1961

2,977,035
COMPENSATING MEANS FOR WEB FEEDER

William J. Tilton and Kenneth N. Moore, Middletown, Ohio, assignors to Raymond Bag Corporation, Middletown, Ohio, a corporation of Virginia Filed Dec. 18, 1957, Ser. No. 704,226

15 Claims. (Cl. 226—31)

This is a continuation-in-part of application Serial No. 514,066, filed June 8, 1955, now abandoned, and entitled "Compensating Means for Web Feeder."

Our invention relates to web feeders and more particularly to the provision of compensating means for automatically regulating the speed of a moving web so as to maintain predetermined areas of the moving web in registry with respect to the operation of timed components of the machine, such as a cutting knife for severing the web into predetermined unit lengths.

In the machine feeding of a web in timed relation to the movement of operating components of the machine, it has hitherto been suggested to provide variable speed mechanism for controlling the movement of the web and to provide means for actuating the variable speed mechanism to correct any variation in the position of the web with respect to the timed components of the machine. Such devices find particular utility where the web is imprinted and it is necessary to maintain the imprint in proper registry with respect to the timed movement of a cutoff knife or the like.

A principal object of the instant invention is the provision of an improved device for detecting any variation in the position of the moving web and hence in the position of the imprint thereon relative to a timed component of the machine, whereby variable speed mechanism may be set into operation to compensate the over feeding or under feeding of the web, as the case may be.

A further object of our invention is the provision of a compensating device of the character described which may be readily adjusted for varying conditions of use, whereby proper registry of the web and imprint may be obtained irrespective of the length of the sections into which the web is to be severed.

A further object of our invention is the provision of a compensating device incorporating a control system by means of which the feeding speed of the web may be automatically accelerated or retarded depending upon whether the web is lagging behind or running ahead of its proper position.

Still a further object of our invention is the provision of control systems for use in conjunction with web compensating means which may be manually reversed by the operator depending upon whether the web is running ahead or lagging behind, or which may be automatically reversed without the intervention of the machine operator.

Yet a further object of our invention is the provision of improved selectors which form a part of the compensating device and which may be adjusted over a wide range of operating conditions.

These and other objects of our invention which will appear hereinafter or which will be apparent to the skilled worker in the art upon reading these specifications, we accomplish by that construction and arrangement of parts of which we shall now describe an exemplary embodiment.

Reference is now made to the accompanying drawings wherein:

Figure 10 is a circuit diagram showing the connection of the detector with the controlling mechanism.

The illustrated embodiment of the invention shows our improved compensating means used in conjunction with a bag forming machine such as that disclosed in Sharkey et al. Patent No. 2,038,452; but it will be understood that the particular machine in question is solely for purposes of illustration and does not constitute a limitation on our invention. It will be understood further that the invention may take various forms and may be utilized in connection with various kinds of web feeding machines wherein the problem of registration or synchronism of the movement of the web relative to the operating components of the machine is encountered.

The basic machine

Figure 1:
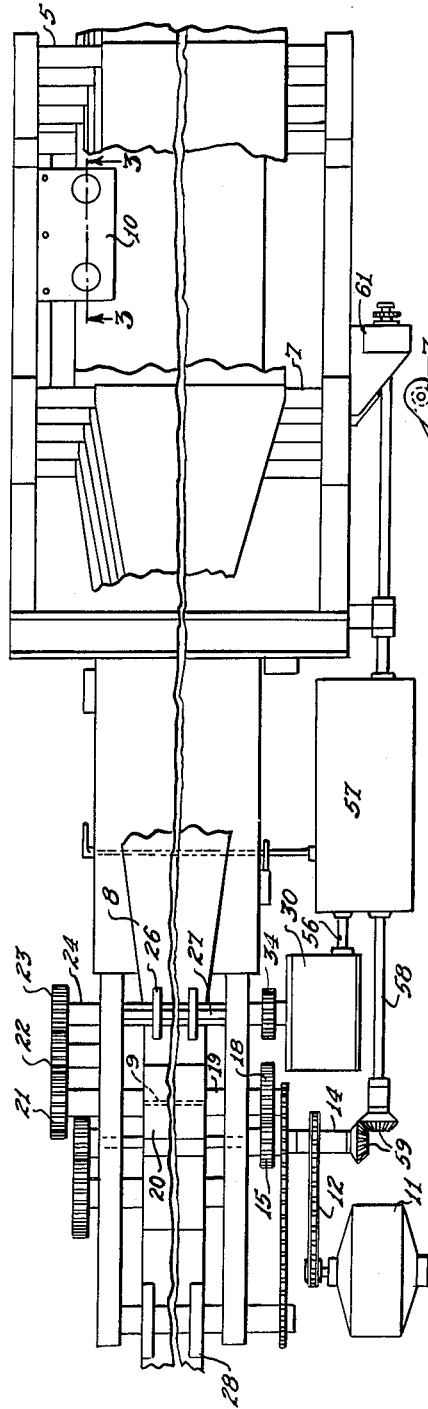
Figure 1 is a plan view of a machine embodying our invention.
Figure 2:
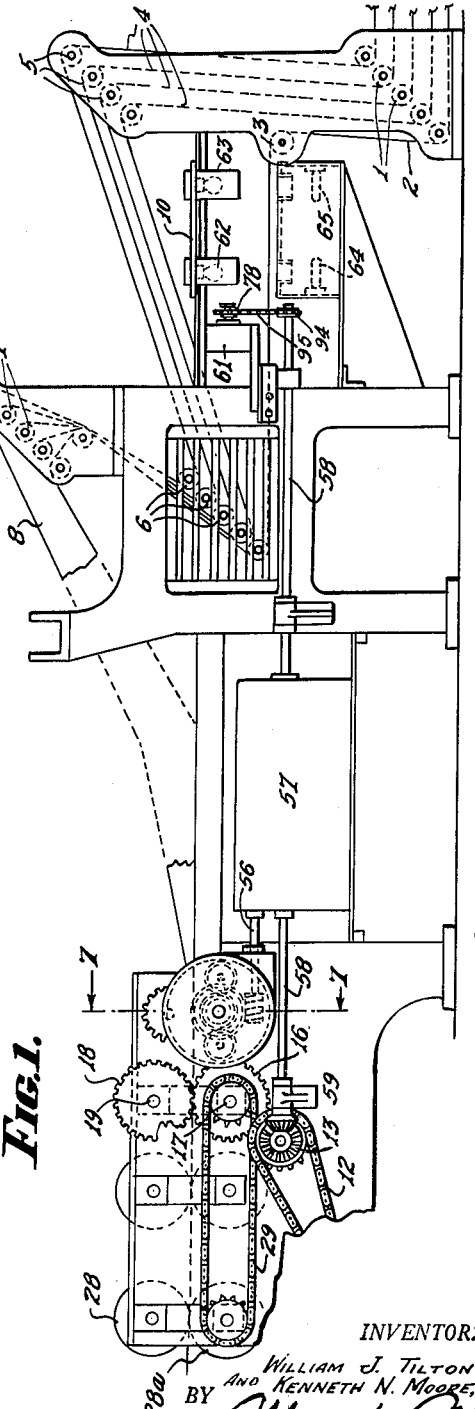
Figure 2 is a side elevation with certain parts in dotted lines of the device of Figure 1.

The bag forming machine illustrated in Figures 1 and 2 of the drawings is adapted to receive a plurality of webs of paper or other similar material, to fold the webs longitudinally into tubular form, adhesively secure the edges of each web one to the other and deliver the folded webs to cutting mechanism which severs them into sections of predetermined length. The webs, as they are passed through the machine, are folded one about the other and delivered to the cutting mechanism in nested relation.

The web which forms the outer wall of the bag will carry printed indicia thereon, and it is this imprint which must occupy a predetermined position relative to the ends of the finished bags. It is therefore necessary that the bags be moved in timed relation to the movement of the cutting mechanism so that the webs will be cut on predetermined lines between adjacent imprints. It will be understood that the imprint may be placed on the outermost web before the web is delivered to the machine or the mechanism for imprinting the web may be incorporated as a part of the machine and arranged to act upon the web in advance of its delivery to the web folding mechanism.

The machine illustrated is adapted to form a five wall bag and consequently five webs of paper are delivered to the machine from separate supply rolls (not shown). The webs pass about guide rollers 1, the lower or outermost web 2, which carries the printed indicia or imprints and forms the outer wall of the bag passing around a guide roller 3 for movement in a horizontal plane. The remaining webs 4 pass around guide rollers 5 spaced above the roller 3. The several webs are then led about the bank of guide rollers 6 from which they are passed over an additional bank of guide rollers 7 and then fed to a forming device 8 which folds the webs one about the other in tubular form, whereupon the nested tubes are delivered to the cutting mechanism 9 for severance into individual bag lengths.

The position of the guide roller 3 with respect to the guide rollers 5 results in separating the outer web 2 from the remainder of the webs; and the detecting device, indicated generally at 10, is conveniently positioned to act upon the outer web while it is separated from the remainder of the webs. It will become apparent as the description continues that the instant invention is applicable to a machine capable of handling a single web as well as to a machine handling a plurality of webs. Since the additional webs, such as the webs 4, are in no way concerned with the instant invention as such, the term "web" will be used to indicate either a single web of material or, where several webs are nested, the web which carries the printed indicia or imprints. Similarly, it will be understood that the terms "printed indicia" or "imprint" are intended to include any markings or other characteristic which may be placed upon or imparted to the web, whether placed thereon by printing or otherwise.

Figure 4:
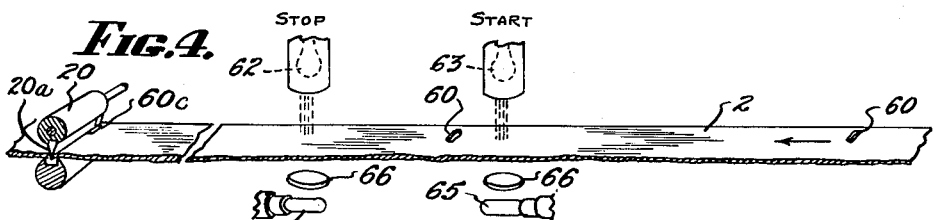
Figures 4 and 4a are diagrammatic perspective views illustrating the coaction of the selector and detecting device.
Figure 7:
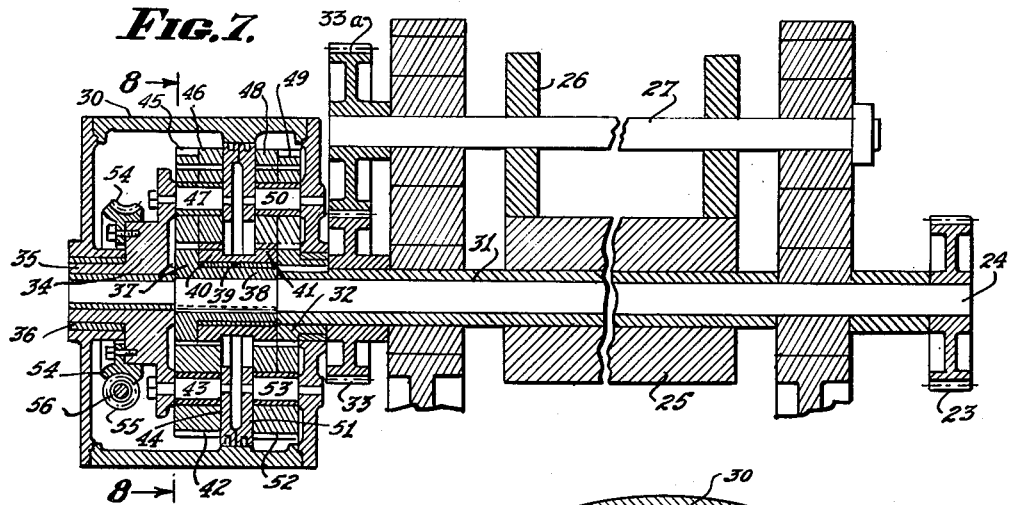
Figure 7 is a vertical sectional detail view of the variable speed drive for the web feeding mechanism taken along the line 7—7 of Figure 2.

The machine may be driven from any suitable source of power, such as the motor 11 which is connected by a chain 12 to a sprocket wheel 13 fixed to the main drive shaft 14 which extends transversely of the machine. A gear 15 on the drive shaft meshes with a gear 16 on a shaft 17 which mounts a lower cutter roller or anvil forming a part of the cutting mechanism. The gear 16 also meshes with a gear 18 fixed to a shaft 19 on which is mounted the upper cutter roller 20 carrying a cutting knife 20a (Figure 4). The cutting mechanism is thus driven in timed relation to the movement of the main drive shaft 14. At its opposite end the shaft 17 has secured thereto a gear 21 which is connected through an idler gear 22 to a gear 23 on the shaft 24 of a lower feed roller 25 (Figure 7). An upper feed roller 26, which may conveniently comprise two narrow rollers or discs, is carried by a shaft 27 driven from the shaft 24 of the lower feed roller in a manner which will be hereinafter described. These feed rollers serve to draw the web, or webs, of material from the supply rolls over the guide rollers and through the folding mechanism for delivery to the cutting rollers. The severed bag lengths are withdrawn and delivered from the machine by feeding out rollers 28 and 28a which are driven by a chain 29 operatively connected to the lower cutting roller shaft 17.

The arrangement and timing of the feeding rollers is such that a section of the web equal in length to the bag being formed will be delivered to the cutters upon each operation thereof. The imprints on the web will be arranged to occupy predetermined positions with respect to the lengths of the individual bag sections being formed, and in the timed operation of the machine the imprints will be in proper position with respect to the cutters so that the web will be severed in the areas between adjacent imprints. However, the position of the imprints with relation to the cutters will vary due either to the slippage of the feed rollers on the web, the inaccurate spacing of the imprints on the web by the printing mechanism, or for other reasons; and any such variation must be promptly corrected. In accordance with our invention these variations are corrected by means of variable speed mechanism for accelerating or retarding the driving speed of the feed rollers 25 and 26 and automatically acting detecting means for causing the variable speed mechanism to alter the speed at which the web is advanced so as to thereby correct the position of the imprints with relation to the cutters.

Variable speed mechanism

The variable speed mechanism is mounted in a gear box 30 supported on the machine frame and the drive shaft 24 for the lower feed roller 25 extends into the gear box, as seen in Figure 7. The lower feed roller 25 is carried by a sleeve 31 which is rotatably mounted on the shaft 24 and extends into the gear box where it is provided with a gear 32. A gear 33 is secured to the sleeve 31, preferably between the gear box and the machine frame, the gear meshing with a gear 33a secured to the shaft 27 of the upper feed roller, so that the two feed rollers are caused to rotate in unison in opposite directions. Mounted within the gear box for rotation about the axis of the shaft 24 is a supporting member or frame 34 which is provided with an elongated hub 35 which is journaled in a bearing 36 in the outer wall of the gear box and which the adjacent end of the shaft 24 is rotatably supported. Rigidly secured to the shaft 24 is a gear 37 having an elongated hub 38 on which is mounted a sleeve 39 having rigidly secured thereto, at is respective ends, gears 40 and 41. The gears 40 and 41 are of the same diameter as the gear 37 and have a slightly smaller number of teeth. For example, the gear 37 may have thirty-six teeth and the gears 40 and 41 may have thirty-five teeth each. The gear 32 on the sleeve 31 is of the same diameter as and has the same number of teeth as the gear 37. The gears 37 and 40 mesh, on one side of the shaft, with a planetary gear 42 which is of sufficient width to mesh simultaneously with both gears. The gears 37 and 40 being rotatable with relation to each other will assume a position in which the teeth thereof will be in line at that point where they mesh with the gear 42 but will be slightly out of line on the opposite side of the shaft. The gear 42 is carried by a short shaft 43 which is supported at one end in the rotatable supporting member or frame 34 and at the other end in an annular frame or collar 44 which is mounted within the gear box. The gears 37 and 40 mesh, on that side of the shaft opposite the gear 42, respectively, with gears 45 and 46, which are mounted on a stud 47 carried by the supporting member 34 and the collar 44. These two gears 45 and 46 have the same number of teeth and are rigidly connected one to the other in such positions that the teeth will be slightly out of line so that the gear 45 will mesh with the gear 37 and the gear 46 will mesh with the gear 40, the teeth of the gears 37 and 40 being slightly out of line at the point at which they engage the gears 45 and 46. The gear 41, which is rigidly connected with the gear 40, meshes with a gear 48 having rigidly secured thereto a gear 49 which meshes with the gear 32 on the sleeve 31. The gears 48 and 49 are carried by a stud 50 supported at one end in the end wall of the gear box and at the other end on a stationary frame or collar 51. The gears 48 and 49 have the same number of teeth as the gears 45 and 46 and the teeth of the two gears are slightly out of line so that they will mesh simultaneously with the gears 41 and 32. The gears 41 and 32 also mesh with a wide gear 52 arranged on the opposite side of the shaft and carried by a stud 53 mounted in the end wall of the gear box and in the collar 51. Rigidly secured to the supporting member 34 is a worm gear 54 which meshes with a worm 55 on a shaft 56 which extends lengthwise of the machine beyond the rear side of the gear box 30. The shaft 56 and the worm 55 are normally stationary but may be rotated in one direction or the other to impart a like movement to the supporting member 34. When the worm 55 is stationary the supporting member will be held against movement and the rotation of the shaft 24 and the gear 37 will cause the gears 45 and 46 to rotate and this movement will be imparted through the gears 40 and 41 and the gears 48 and 49 to the gear 32 on the sleeve 31, thus causing that sleeve and the feed rollers to rotate at the same speed at which the shaft 24 is rotated. If the worm 55 is rotated in a direction to impart forward rotation to the supporting member 34, the gears 45 and 46 will not only be rotated by the gear 37 on the shaft but will be rotated with relation thereto and will thus impart movement to the gears 40 and 41 in addition to the movement imparted thereto by the gear 37 and will thereby cause those gears to move at a speed slightly greater than the speed at which the shaft 24 rotates. In the present arrangement the difference in the rotations of the gears 40 and 37 is equal to one tooth for each complete rotation of the supporting member. The accelerated movement of the gears 40 and 41 will be transmitted through the gears 48 and 49 to the gear 32 on the sleeve 31, thus causing the feed roller to be rotated at a speed slightly greater than the speed at which the shaft 24 is rotated. Consequently if the imprints on the web have lagged slightly behind their normal position the accelerated speed of the feed rollers will return them to their normal position. Should the supporting frame 34 be rotated in a reverse direction the gears 40 and 41 will be retarded and a slower movement will be imparted to the web, thus retracting the imprints with relation to the cutting mechanism.

*Clutch mechanism*

The means for imparting rotation to the shaft 56 which controls the speed at which the feed rollers are operated and for determining the direction in which the shaft is rotated may take various forms. In the present embodiment the shaft 56 is driven from the main drive shaft 14 through an automatically controlled electric clutch mechanism indicated at 57. The clutch mechanism will be powered from the main drive shaft by means of a shaft 58 connected at its forward end to the main drive shaft by miter gears 59. It will be understood that the clutch mechanism 57 when operatively engaged with the shaft 58 will act to drive the variable speed mechanism through the shaft 56, the direction of rotation of the shaft 56 being determined by whether the clutch mechanism is in the "forward" or "reverse" position. In lieu of an automatically controlled electric clutch, the clutch mechanism 57 may comprise a clutch control such as that described in the aforementioned Sharkey et al. Patent No. 2,038,452.

*The detecting device*

The electrically operated clutch mechanism which controls the movement of the variable speed mechanism is automatically actuated in accordance with the position of the imprint on the web. In the embodiment illustrated the web 2 is provided with a series of spaced apart apertures or openings 60 (Fig. 4) which are preferably formed in the web simultaneously with the placing of the imprints thereon so that each aperture will occupy a predetermined position with relation to the corresponding imprint. Preferably the apertures, which are preferably elongated at right angles to the direction of motion of the web, will coincide with the areas between adjacent imprints; it being intended that the cutter will sever the web into individual bag sections along transverse lines of cut passing through the apertures. Coacting with the apertures in the web is a selector 61 (Figures 1 and 2) which includes a rotatable part driven in timed relation to the cutting mechanism and arranged to close circuit switches forming a part of a control circuit including the electronic detecting device 10 which is adapted to be activated by the passage of beams of light through the apertures in the moving web.

Figure 3:
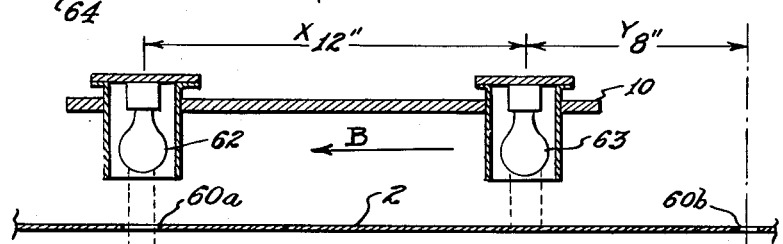
Figure 3 is an enlarged sectional view taken along the line 3—3 of Figure 1.

As best seen in Figure 3, the apertures 60 in the web 2 are adapted to coact with spaced apart light sources 62 and 63 forming a part of the detecting device 10 and arranged to direct beams of light downwardly onto the moving web in the path of the advancing apertures. Positioned beneath the web 2 in alignment with the light sources 62 and 63 are photoelectric cells 64 and 65 which will be energized by the beams of light from the light sources 62 and 63 upon registry of the apertures 60 therewith. Sets of lenses 66 are arranged between the light sources and the photoelectric cells to focus the beams of light passing through the apertures onto the photoelectric cells. As will be explained more fully hereinafter, the photoelectric cells will be energized upon the passage of each successive aperture through the beams of light; and the energizing of the photoelectric cells will serve to close a portion of the control circuit for activating the electric clutch mechanism 57.

*The selector*

The selector 61 is the heart of the detecting device in that it correlates the timed movement of the cutters and the relative position of the advancing web, as determined by the photoelectric cells, the selector acting automatically to complete the clutch activating circuit when the movement of the web is not synchronized with the timed movement of the cutters. In addition, the selector serves to adjust the timing of the parts so that the detecing mechanism may be readily adjusted to accommodate bag sections of different lengths.

Figure 5:
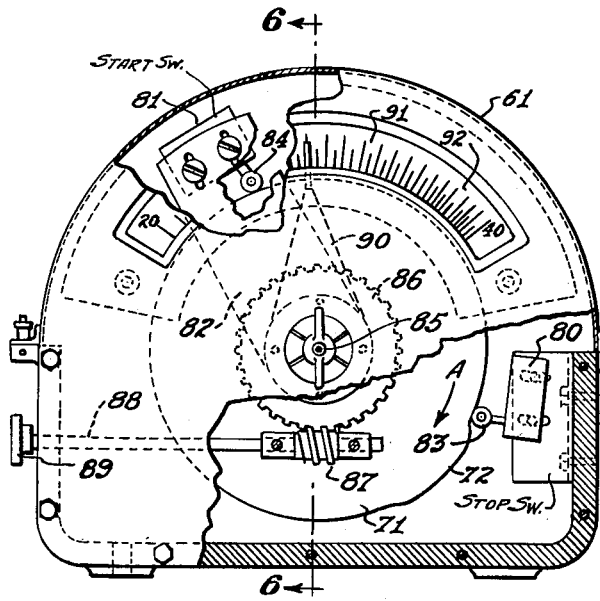
Figure 5 is a side elevational view with parts broken away of the compensator selector switch.
Figure 6:
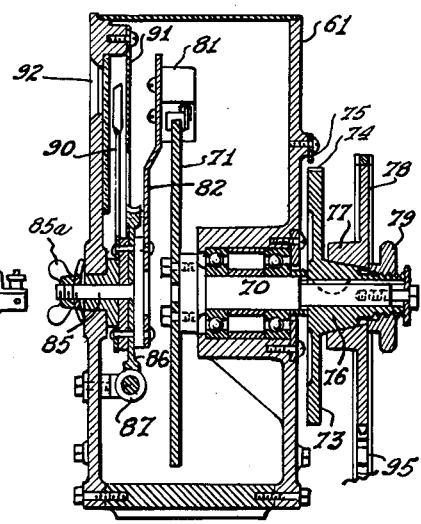
Figure 6 is a sectional view taken along the line 6—6 of Figure 5.

As best seen in Figures 5 and 6, the selector comprises a housing in which is rotatably journaled a shaft 70 to the inner end of which is secured a rotating disk or cam 71 having a rise 72 on the periphery thereof, the rise in the instant embodiment comprising a 30° segment of the circumference of the disk. At its opposite end the shaft 70 has a face plate 73 keyed thereto, the face plate having a notch 74 therein which, as will be explained more fully hereinafter, is adapted to be aligned with a marker or pointer 75 fixed to the selector housing. The face plate 73 has a wedge-shaped hub 76 extending outwardly therefrom against which is seated the wedge-shaped shank 77 of a sprocket wheel 78. The sprocket wheel is urged into engagement with the hub 76 by means of a hand screw 79 threaded on the free end of the hub. When the hand screw is tightened the sprocket wheel 78 will be secured to the hub of face plate 73, thereby operatively connecting the shaft 70 to the sprocket wheel for movement thereby. Loosening of the hand screw 79 will free the face plate 73 and shaft 70 for adjusting movement relative to the sprocket wheel, as will be hereinafter explained.

Coacting with the disk 71 is a pair of normally open switches 80 and 81, the switch 80 being a fixed switch secured to the selector housing and the switch 81 a movable switch secured to an adjustable arm 82. The switches carry rollers or cam followers 83 and 84 adapted to contact the periphery of the disk 71 as the latter is rotated, contact of the rollers with the rise 72 of the disk causing the switches to be closed during such time as the rollers are riding on the rise.

The arm 82 is mounted on a shaft 85 journaled in the selector housing in axial alignment with the shaft 70, the arrangement being such that movement of the arm 82 will move the switch 81 along the periphery of the disk 71. The arm is moved by means of a worm gear 86 engaged by a worm 87 mounted on a shaft 88 extending outwardly through the side of the housing and carrying a thumb screw 89 on its free end. A wing nut 85a on shaft 85 serves to lock the selector arm 82 in position after setting by means of thumb screw 89. A pointer 90 is also operatively connected to the arm, the pointer coacting with a dial 91 visible through an opening 92 in a side of the selector casing.

The disk 71 is adapted to be driven in timed relation to the movement of the cutting mechanism 9, the disk 71 making one revolution with each revolution of the cutters. To this end the sprocket wheel 78 is driven from an extension of the longitudinal drive shaft 58, the shaft 58 carrying a sprocket wheel 94 having a chain 95 connecting it with the sprocket 78. As seen in Figure 5, the disk 71 is adapted to be rotated in a clockwise direction as indicated by the arrow A.

As indicated above, the disk 71 is adapted to rotate in synchronism with the cutters making one revolution for each revolution of the cutting knife 20a.

In order to understand the operation of the device it must be remembered that the device is intended to (1) handle bag sections of different lengths, and (2) compensate both for over feeding and under feeding of the web. In order to do this, one of the light sources must be constituted the "start" light for initiating or starting the compensating movement of the clutch mechanism and the remaining light source constituted the "stop" light for stopping the compensating mechanism once the web has been returned to proper registry. Similarly, the selector switches 80 and 81 must be constituted "start" and "stop" light sources. Next, it must be understood that the light sources 62 and 63 and their corresponding photoelectric cells 64 and 65 are spaced apart by a fixed distance X which is less than the distance between adjacent apertures in the web 2. In the embodiment illustrated, which is exemplary only, the distance between the light sources 62 and 63 is arbitrarily chosen at 12 inches, whereas the device is adapted to handle bag sections which may vary in length from 20 to 40 inches. If, for example, the bag sections are to be 20 inches long, then the distance between adjacent apertures in the web will be 20 inches. This being the case, when a given aperture 60a (Figure 3) is in alignment with the light source 62, the next succeeding aperture 60b (assuming the direction of movement to be in the direction of the arrow B) will be spaced rearwardly from the trailing light source 63 by the distance Y, which in this case is 8 inches. As the web 2 is advanced, the aperture 60b will have to move forwardly the distance Y, or 8 inches before it comes into alignment with the light source 63. This latter distance Y is represented on the selector by the angular distance between the switch 80 and the switch 81, the dial 91 being calibrated to correspond to the distance Y. Thus, when the pointer 90 is set at "20" on the dial, the machine will be set up to handle bag sections having a length of 20 inches and the time required for a given point on the periphery of the disk 71 to travel from the roller 83 to the roller 84 will be equal to the time required for the aperture 60b to move the distance Y which, in the illustration given, is 8 inches.

Assuming now that the web is to be speeded up to compensate for under feeding, the light source 63 will be constituted the "start" light and the coacting switch 81 the "start" switch; and similarly the light source 62 will be constituted the "stop" light and coacting switch 80 the "stop" switch.

Figure 4A:
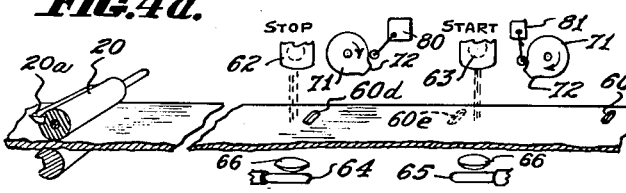

When the machine is set up in the manner described above, which is for speeding up the movement of the web, initial registry is obtained, as seen in Figure 4, by bringing the aperture 60c into alignment with the cutoff knife 20a with the latter in the cutting position. This establishes the proper initial adjustment of the cutting mechanism relative to the apertures and hence the imprints on the web. The web is then advanced together with the cutting mechanism until the next successive aperture 60d is positioned as shown in Figure 4a, in which position the leading edge of the aperture lies just to the rear of light beam from the "stop" light 62. The operator next sets the selector in accordance with the length of the bag sections to be acted upon. If, in accordance with the preceding example, the bag sections are to be 20 inches long, the pointer 90 will be set opposite the 20 inch mark on the dial 91. Thereafter, the hand screw 79 is backed off so as to free the face plate 73 for rotation; and the face plate is rotated until the mark 74 thereon is aligned with the pointer 75. The mark 74 is so correlated to the position of the fixed switch 80 that the alignment of the mark with the pointer 75 will position the rise 72 of the disk so that it lies just beyond the roller 83. In other words, when the aperture 60d lies just to the rear of the "stop" light, the roller 83 will have just dropped off the rise 72 and the fixed switch 80, which is the "stop" switch, will have just opened. Upon alignment of the mark 74 with the pointer 75, the hand screw is tightened so as to couple the shaft 70 to the sprocket wheel 78 and the machine is ready to be started by actuating the prime mover 11.

*The control circuit*

Upon the starting of the machine and the forward movement of the web in the direction of the arrow B, the properly registered aperture 60d immediately enters the path of the "stop" light 62 and the photoelectric cell 64 will be energized. As seen in the wiring diagram of Figure 10, the energizing of the photoelectric cell 64 will cause current to flow between conductors 96 and 97, the former being connected by suitable resistors to a conductor 98 which in turn is connected to a conductor 99 leading to the open "stop" switch 80. The conductor 97 is connected to an amplifying tube 100 from which the current passes through connector 101 to the coil 102 of a single pole-double throw relay 103, the opposite end of the coil 102 being connected through connector 104 to the "stop" switch 80. Since the rise 72 of the rotating disk 71 will have already passed beyond the roller 83, the "stop" switch will be open and the relay 103 will remain in its initial position, in which position the contact 105 of the relay is connected to the pole 4 through the conductor 106, and the movable contact 107 is connected to the movable contact 108 of a second single pole-double throw relay 109 by means of conductor 110. In the normal position of the relay 109 the contact 108 is connected to the contact 111 which, through conductor 112, is connected to pole 2. A conductor 113 runs from the pole 2 to the contact 114 of a double pole-double throw relay 115 where the circuit terminates, the contact 114 being open. Similarly, a conductor 116 connects the pole 4 and the contact 117 of the relay 115, the contact 117 being normally contacted by the movable contact 118 which is in turn connected by a conductor 119 to the normally open movable contact 120 of a double pole-single throw relay 121. Thus, when the properly registered aperture passes beneath the "stop" light 62, the selector "stop" switch 80 will be open, a complete circuit will not have been formed, the partial circuit terminating in open ends at the contacts 114 and 120, and the clutch mechanism will remain in its rest position.

As the web continues its forward movement the next succeeding aperture 60e (Figure 4a) will next come into registry with the "start" light 63, thereby energizing the photoelectric cell 65 and forming a connection between conductors 122 and 123. The conductor 122 is connected through suitable resistors to the conductor 99 and from it to the adjustable "start" switch 81. The conductor 123 passes through amplifier tube 124 and conductor 125 to the coil 126 of the relay 109, the coil 126 being in turn connected to the switch 81 through conductor 127. If the web is still in proper registry with respect to the cutters, the aperture 60e will pass beneath the "start" light 63 just prior to the time the rise 72 reaches the roller 84 of the "start" switch 81 and the switch will still be open at the time the light source energizes cell 65. Since the switch is still open the contacts 108 and 111 of relay 109 will remain joined and a circuit will be formed leading to the poles 2 and 4 which, as explained above, terminate in open contacts 114 and 120 in the relays 115 and 121, respectively. When the switch 81 is thereafter closed by the rise in the disk, the aperture will have passed beyond the light source 63 and the circuit will have been broken between the conductors 122 and 123.

If, however, the web is out of registry and lagged behind its proper position, due to slippage or otherwise, then the aperture 60e will reach the "start" light at a slightly later than normal time and at a time when the rise 72 of the rotating disk will have contacted the roller 84 and closed the "start" switch 81. Closing of the switch 81 closes the circuit between the conductors 99 and 127, thereby energizing coil 126 of relay 109 and bringing movable contact 108 against contact 128 which is connected, through conductor 129, to pole 1. Pole 1 is connected through conductor 130 to contact 131 of relay 115, and the contact 131 is normally connected through contact 132 and conductors 133 and 134 to the coil 135 of relay 121. The coil 135 is energized through conductors 136, 137, transformer 138, conductors 139 and 140, normally closed stop switch 141 and conductor 142 leading to pole 5 which is, in turn, connected to conductor 110 by a conductor 143, the conductor 110 being secured to the movable contact 108 of relay 109, thereby completing the circuit. Energization of the coil 135 closes contacts 144 and 145 of relay 121 thereby connecting conductors 146 and 147, the former being connected directly to one pole of the source of power and the latter being connected through conductor 148, forward switch 149 and conductor 150 to the "advance" lead to the electric clutch, the circuit to the electric clutch being completed by the common lead 151 connected to the opposite pole of the current source. The clutch mechanism 57 is thus actuated to initiate movement of the variable speed mechanism in the direction to speed up the movement of the feed rollers and hence the moving webs.

When the coil 135 of relay 121 is energized, it also serves to connect the normally open contact 120 and the contact 152, thereby forming a holding circuit through the contact 120, conductor 119, contacts 118 and 117 of relay 115 and conductor 116 leading to pole 4. Pole 4 connects with pole 5 through contacts 105 and 107 of relay 103, and pole 5 completes the holding circuit through conductors 142, 140, 139, 137 and 136, to maintain the coil 135 energized and thereby continue the advancing movement of the electric clutch. The holding circuit is necessary since the switch 81 will reopen as soon as the rise 72 passes beyond the roller 84, thereby de-energizing the coil 126 and breaking the connection between contacts 108 and 128.

The holding circuit will, however, persist so long as the contacts 105 and 107 of relay 103 are joined. The contacts will be separated only when the aperture 60e will have advanced sufficiently to underlie the "stop" light 62 while the roller 83 of the "stop" switch 80 is riding on the rise of the disk 71 and the switch 80 thereby closed. The initial setting of the selector, it will be remembered, was such that the roller 83 had just dropped off the rise as the aperture approached the "stop" light. However, if the speed of the web is advanced sufficiently to bring one of the apertures into registry with the "stop" light 62 in advance of the movement of the rise beyond the roller 83, the "stop" switch 80 will be closed at the same time the photoelectric cell 64 is energized and a circuit will be formed through the conductors 99 and 104 serving to energize the coil 102 and thereby break the connection between the contacts 105 and 107. This breaks the holding circuit established through the poles 4 and 5, de-energizes coil 135 which in turn breaks the connection between contacts 144 and 145 and hence de-energizes the "advance" circuit to the clutch mechanism.

From the above it will be apparent that the clutch mechanism 57 will be set into motion to advance the position of the web only at such times as the web will have lagged behind sufficiently for one of the apertures therein to underlie the "start" light 63 at the same time the "start" switch 81 is closed by the rise in the rotating disk; but once the clutch actuating mechanism has been energized it will remain energized by means of the holding circuit until the speed of the web has been increased sufficiently to move one of the apertures in advance of its normal position sufficiently to underlie the "stop" light 62 while the "stop" switch 80 is closed by the rise in the rotating disk.

Thus far we have considered only how the web may be advanced to compensate for a lag in the advancing web. While this is the situation usually encountered, there are instances when the feed rollers over feed and it is necessary to retard the speed of the web to bring it back into registry. This condition will be readily apparent to the machine operator who has only to throw the switch 149 to the reverse position in order to set the compensator for automatic retarding control. When the switch 149 is thrown to the reverse or clutch retard position, the conductor 148 is then connected to the retard side of the clutch mechanism 57 through a conductor 155; but the contacts 144 and 145 of relay 121 must be closed before the clutch will be actuated. The reverse switch also closes a circuit through the conductor 156 to the coil 157 of relay 115, the opposite side of the coil being connected through a conductor 158 to conductor 137 which acts through transformer 138 and conductor 139 to complete the circuit to the switch.

When the reverse or clutch retard switch is thrown, the light source 62 becomes the "start" light and the light source 63 becomes the "stop" light, and the fixed switch 80 similarly becomes the "start" switch and the switch 81 the "stop" switch. This condition of the parts is illustrated diagrammatically in Figure 9 of the drawings, it being understood that the aperture 60f will, in the synchronized operation of the machine, lie immediately to the rear of the light source 62 as the roller 83 drops off the rise 72 and opens the switch 80. If, however, the web is being over fed, the aperture 60f will have advanced sufficiently to underlie the light source 62 while the switch 80 is still closed, thereby energizing the cell 64 and hence the coil 102 of the relay 103 to form a clutch actuating circuit through poles 3 and 5, the pole 5 in this instance being connected through conductor 142, switch 141, and conductor 140 to the conductor 139. The remainder of the circuit is formed through the conductor 159 leading from the pole 3 to the contact 160 which is now connected to the movable contact 132 by the energized coil 157. The contact 132 completes the circuit through the conductors 133 and 134, the coil 135, the conductors 136 and 137, and the transformer 138 which is joined to the conductor 139. The coil 135 is thus energized and again acts to close the contacts 144 and 145 which serve through the conductors 148 and 155 to energize the retard side of the clutch mechanism.

Once energized the relay 121 will also connect the contacts 120 and 152 to form a holding circuit through the poles 2 and 5, the coil 157 when energized serving to connect the contacts 114 and 118 thereby connecting the holding circuit through the conductors 119 and 113 to the pole 2.

Figure 9:
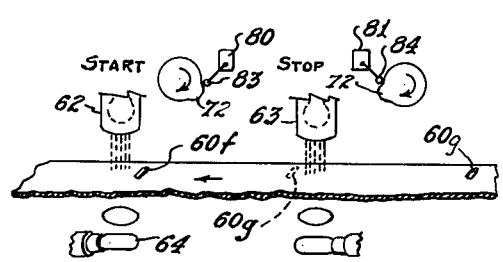
Figure 9 is a diagrammatic perspective view similar to Figure 4 illustrating the operation of the detector when in the "reverse" position.
Figure 8:
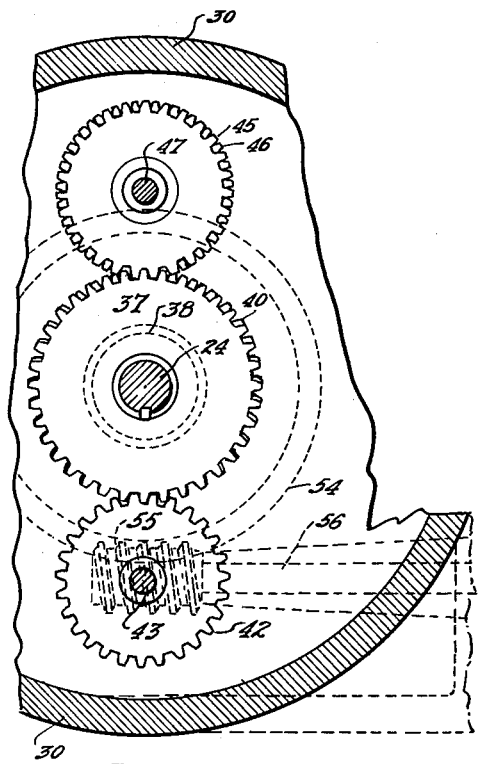
Figure 8 is a sectional view taken along the line 8—8 of Figure 7.

The retarding movement of the clutch mechanism will continue until one of the apertures, such as the aperture 60g in Figure 9, underlies the light source 63 at a time when the roller 84 is still riding on the rise 72. This will cause the coil 126 of relay 109 to close contacts 108 and 128, thereby breaking the hold circuit established through pole 2, contacts 118 and 114 of relay 115, and contacts 120 and 152 of relay 121, thereby de-energizing coil 135 of the relay and releasing contacts 144 and 145, thereby breaking the clutch retard circuit. The clutch mechanism will be de-energized, this time from its retard drive of the variable speed mechanism and the movement of the feed rollers will return to their normal speed.

Manual operation

It is also within the spirit of our invention to provide manually operated means for actuating the clutch control mechanism. To this end a start button 161 may be provided which acts to bypass the photoelectric cells and selector by energizing the coil 135 of relay 121 through a conductor 162. It will be understood that closing movement of the "start" switch 161 will automatically open the "stop" switch 141 thereby breaking the connection between the conductors 140 and 142. Thereafter closing of the "stop" switch 141 will return the clutch control mechanism to the automatic controls.

Dual range selector

Figure 11:
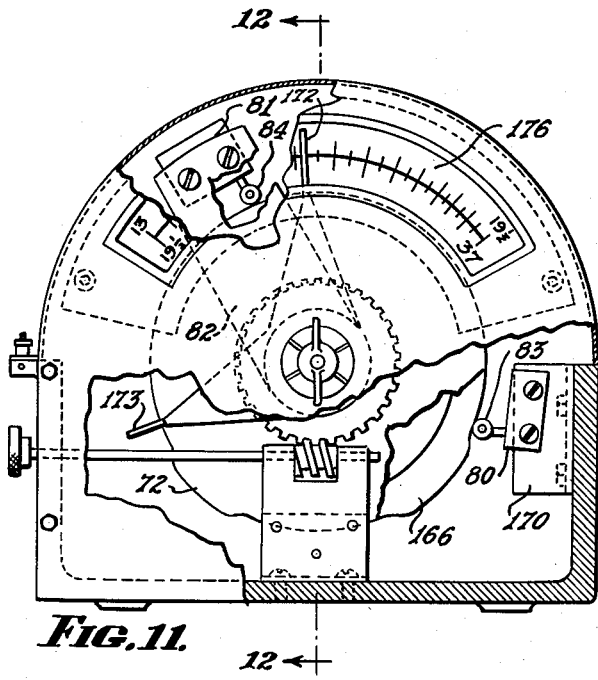
Figure 11 is a front elevational view with parts broken away of a dual range selector switch.
Figure 12:
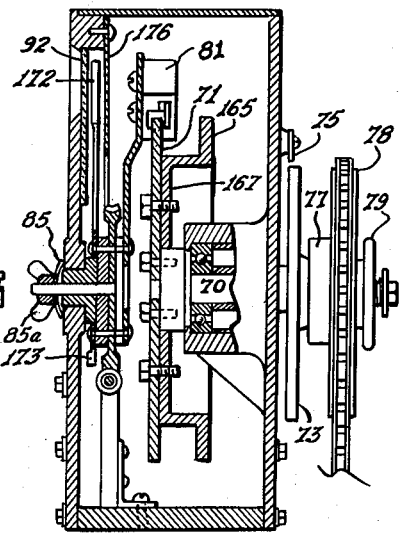
Figure 12 is a sectional view taken along the line 12—12 of Figure 11.

In Figures 11 and 12 of the drawings we have illustrated a dual range selector for materially increasing the range of bag lengths which may be handled. Since a large number of the components of the dual range selector are identical with those of the selector hereinbefore described, like parts have been given like reference numerals to simplify the disclosure.

Figure 14:
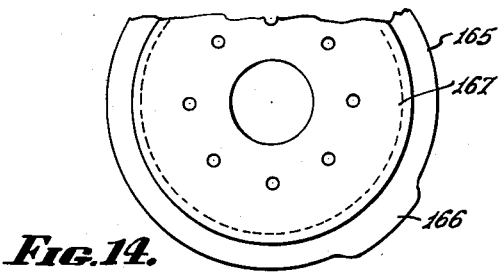
Figure 14 is a partial elevational view of a second rotating disc used in the dual range switch.

In this embodiment the rotating disk 71 secured to the inner end of the driven shaft 70 mounts a second rotating disk 165 which, as best seen in Figure 14, is provided with a rise 166 on the periphery thereof. The rise, as before, may comprise a 30° segment of the circumference of the disk. The disk 165 is provided with a hub 167 by means of which it is secured to the disk 71, the disk 71 being provided with suitable slots 168 and 169 for adjustably mounting the second disk. The hub serves to space apart the two disks. The fixed switch 80 is mounted on a bracket 170 positioned to contact the periphery of the second disk 165, whereas the movable switch 81 secured to the arm 82 is arranged to contact the disk 71. The spacing of the disks is such that, as the movable arm 82 is rotated, the switch 81 may pass the fixed switch 80, thereby permitting a much wider latitude in the movement of the movable switch. A double armed pointer 171 having a first arm 172 and a second arm 173 is operatively connected to the movable arm 82 and the pointer is adapted to coact with double sets of indicia, indicated at 174 and 175, of a dial 176 visible through the opening 92 in the side of the selector casing.

Figure 15:
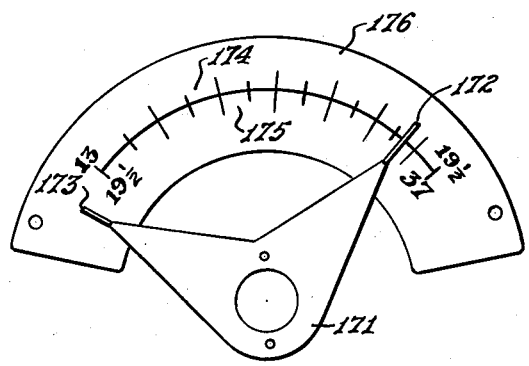
Figure 15 is an elevational view illustrating a double pointer and cooperating dial for use in the dual range selector.
Figure 13:
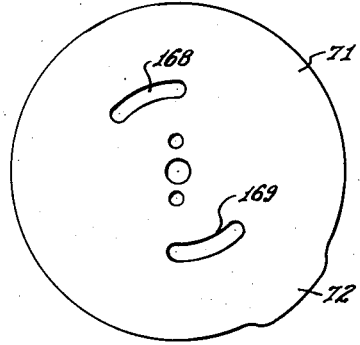
Figure 13 is a side elevational view of one of the rotating discs for use with the dual range switch.

With this arrangement the pointer arm 172 is adapted to coact with the indicia 174 on the dial and the pointer arm 173 is adapted to coact with the indicia 175. The spacing between the two arms of the pointer is such that only one will appear on the dial at a given setting, the pointer 172 moving beyond the face of the dial as the pointer 173 comes on the dial at the opposite side thereof. Thus, as illustrated in Figure 15, the indicia 174 will cover a range of lengths from 13 to 19½ inches whereas the indicia 175 will cover the range from 19½ inches to 37 inches. For convenience sake, the tips of the two pointers and the coacting indicia may be of different color combinations so that no confusion will arise as to which portion of the dial is to be used with each of the pointers.

As best seen in Figure 11, the rise 166 of the disk 165 may be offset with respect to the rise 72 of the disk 71, thereby permitting the cam follower 84 to be contacted and the switch 81 closed independently of the rise controlling the opening and closing of the fixed switch 80. With the rise 72 positioned in advance of the rise 166 in the manner illustrated, the movable switch 81 will be closed after a shorter time interval than is required for the rise 166 to move adjacent the switch 81; and by this expedient the time interval between the closing and opening of the two switches may be carried over a much wider range than is possible where a single rotating disk is employed.

Automatic reversing

Figure 10:
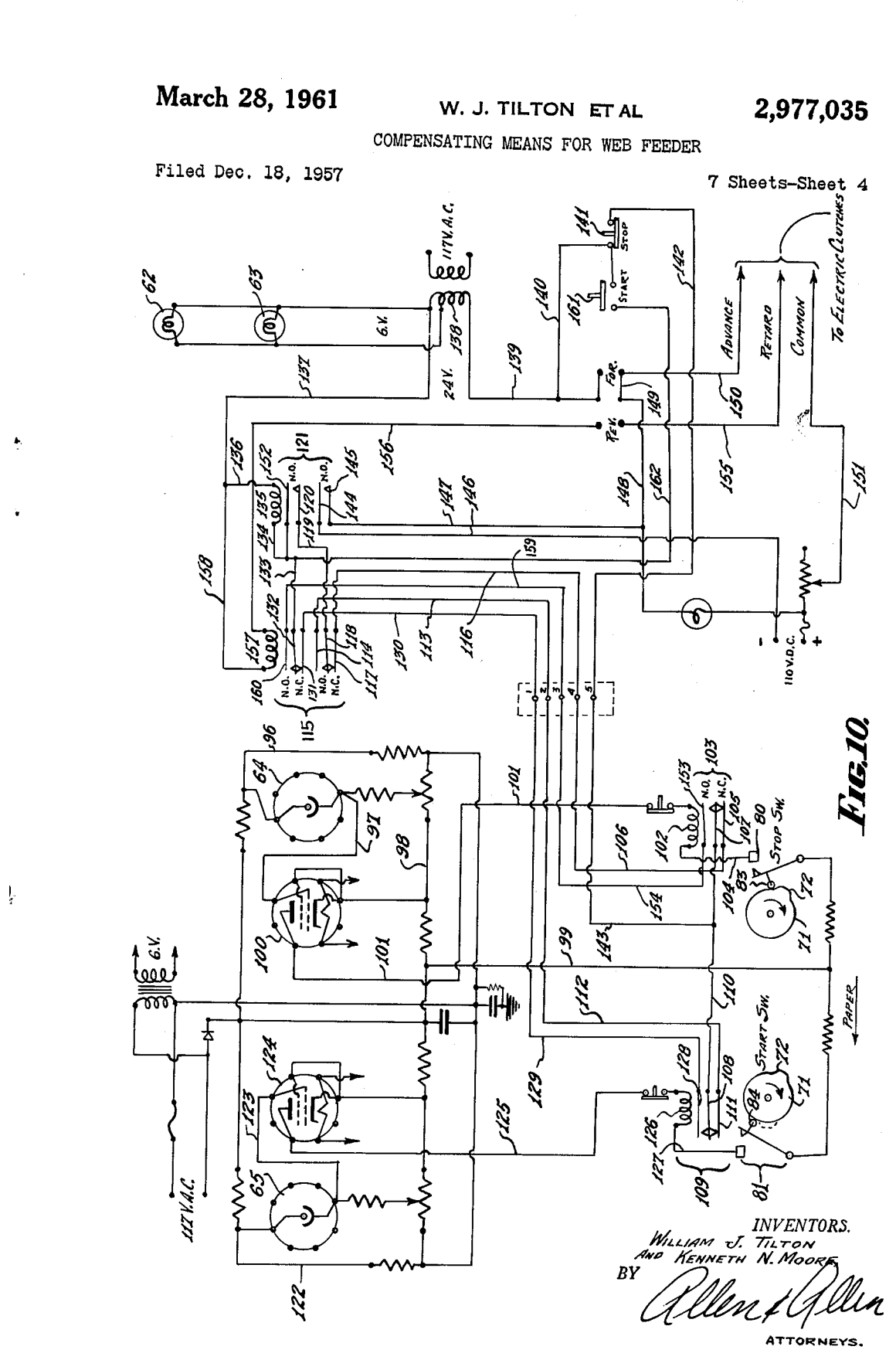

As pointed out in connection with the control circuit illustrated in Figure 10, the reversing of the control system is the responsibility of the machine operator. That is, where it is necessary to retard the speed of the web to bring it back into registry, the operator must throw control switch 149 to the reverse position in order to set the compensator for automatic retarding control. However, in accordance with the modification of our invention illustrated in Figures 16 through 19 of the drawings, the system may be automatically caused to reverse so that the entire device becomes fully automatic for both under feed or over feed.

The automatic reversing system requires a modification both of the selector and of the control circuit. However, since the great bulk of the components are identical, like reference numerals have been used wherever possible in the drawings to denote like parts, thereby avoiding undue duplication.

Figure 16:
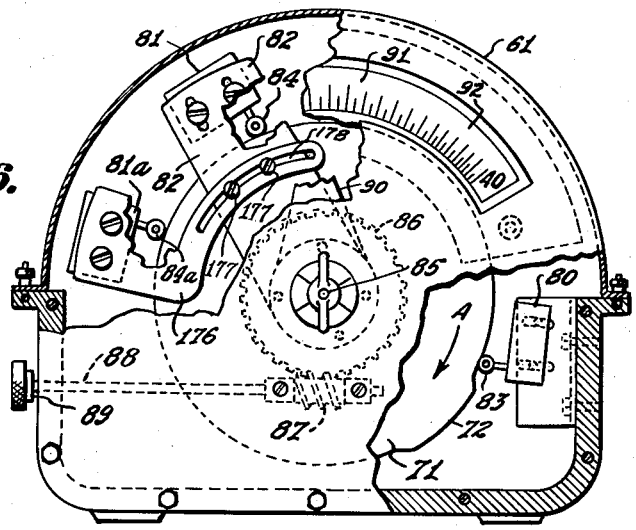
Figure 16 is a side elevational view with parts broken away similar to Figure 5 but illustrating a selector incorporating automatic reversing means.
Figure 17:
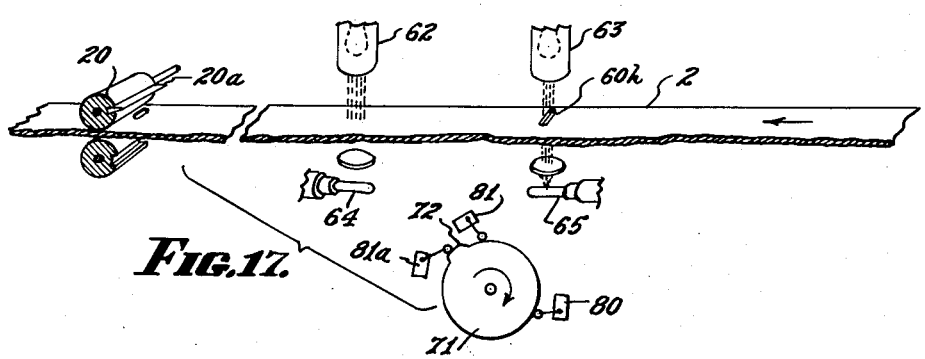
Figure 17 is a diagrammatic perspective view illustrating the coaction of the selector of Figure 16 and the detecting device.

Referring first to Figure 16, we have therein illustrated a selector which is essentially the same as the selector illustrated in Figures 5 and 6, although in this instance the device is provided with a reversing switch 81a which may be conveniently mounted on a bracket 176 adjustably secured to arm 82 by means of adjustment screws 177 which pass through an elongated slot 178 in the bracket. The amount of forward "creep" necessary to cause a reversal of the system is determined by the angular relation between "start" switch 81 and "reverse" switch 81a. The amount of "creep" can be made very short by adjusting these switches to rest immediately on either side of rise 72 of cam 71, or the amount of "creep" can be lengthened by increasing the distance between the two switches.

Figure 18:
Figure 18 is a fragmentary diagrammatic view illustrating the selector in an alternate position of use.
Figure 19:
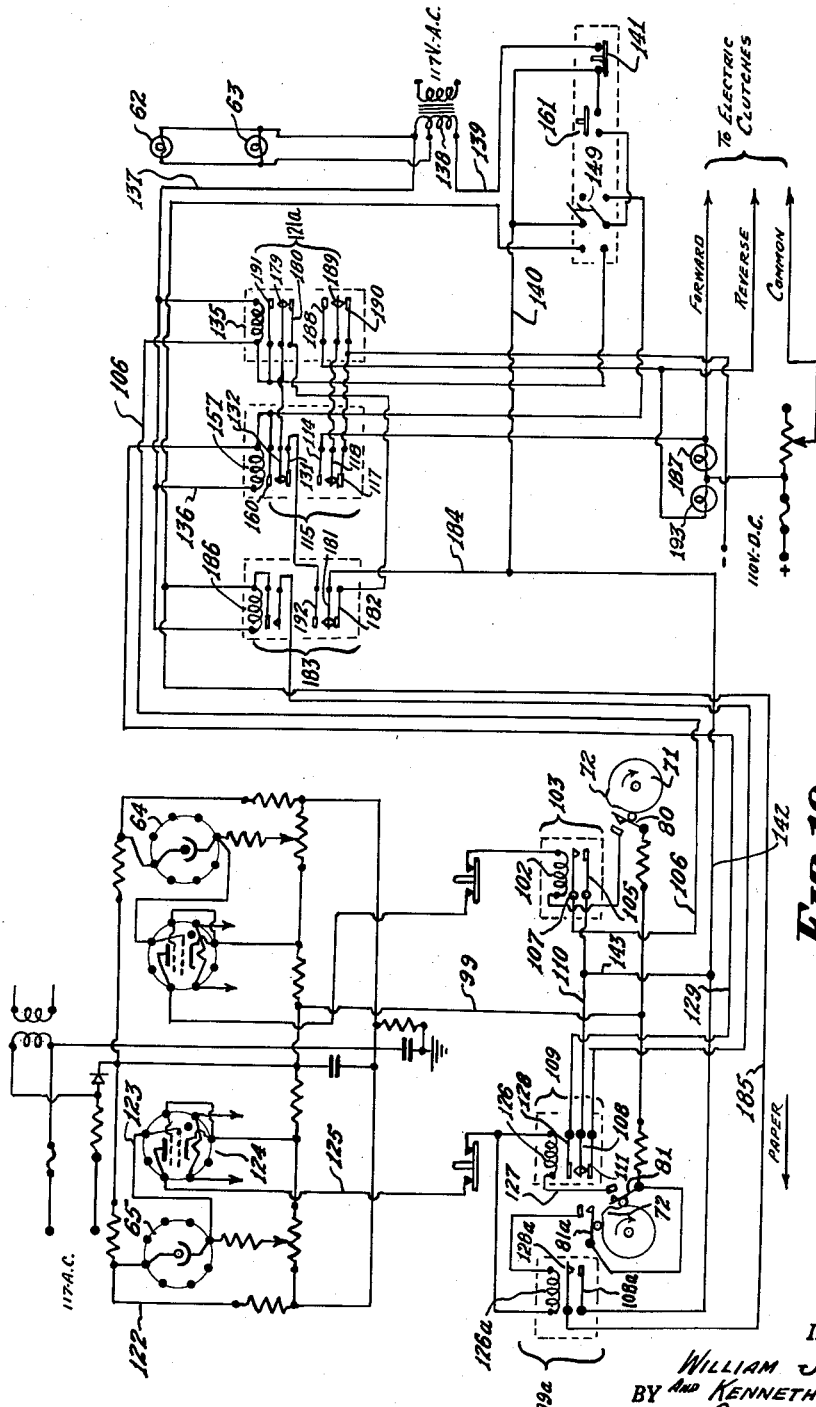
Figure 19 is a circuit diagram similar to Figure 10 but modified to incorporate an automatic reversing system.

With this arrangement, as the aperture 60h (Figure 17) passes "start" light 63, thereby energizing photoelectric cell 65, a connection is formed, as seen in Figure 19, between conductors 122 and 123. This forms a circuit through conductor 123 and amplifier tube 124 to coil 126 of relay 109. In addition, it also forms a circuit to the coil 126a of a supplementary relay 109 connected to reversing switch 81a. If the web is in proper registry, both starting switch 81 and reversing switch 81a will lie on opposite sides of cam rise 72, as illustrated in Figure 18, thereby leaving both circuits open and no correction takes place.

If, however, the web is lagging behind its proper position, coil 126 of relay 109 will be energized since starting switch 81 will have closed by reason of having been contacted by the rise 72 of cam 71. The closing of switch 81 acts to close the circuit between conductors 99 and 127, thereby energizing coil 126 and bringing movable contact 108 against contact 128 which is connected through conductors 129 to coil 157 and contact 160 of relay 115. Similarly, contact 108 is connected through conductors 110, 143, 142, 140, manual stop 141, transformer coil 138 and conductor 137, to the opposite terminal of coil 157, thereby energizing relay 115 and bringing movable contact 132 against contact 160. This closes a holding circuit for relay 115 through normally closed contacts 179 and 180 of relay 121a and the normally closed contacts 181 and 182 of reversing relay 183. The holding circuit is completed through conductors 184, 140, stop button 141 and transformer coil 138. The holding circuit so formed can be broken by the energizing of relay 121a due to actuation of the switch 80 which forms a circuit energizing coil 135 of relay 121a, or by the reversing operation of relay 109a which acts through conductor 185 to energize coil 186 of relay 183.

The energizing of coil 157 in relay 115 also closes contacts 114 and 118 which completes a circuit through "forward" signal light 187 and energizes the "forward" side of the electric clutch. Contacts 117 and 118 will now be open and will act as a safety device to prevent both electric clutches from being energized at one time by guaranteeing an open circuit to the "reverse" clutch even though the contacts 188 and 189 might be closed in relay 121a.

When the photo-tube 64 is energized after the web has advanced sufficiently to bring it back in timed relation with the cut-off knife, and while stop switch 80 is on the rise of the cam, the circuit to coil 102 of relay 103 is completed, causing contacts 107 and 105 to close. This completes the circuit to coil 135 of relay 121a and opens contacts 179 and 180, thereby breaking the holding circuit through coil 157 of relay 115 and causing the forward clutch to be de-energized, thus stopping the advancing movement of the web.

The energizing of relay 121a also causes contacts 188 and 189 to close, thereby completing the circuit to the "reverse" clutch only for the length of time it takes switch 80 to drop off rise 72 on cam 71. At slow speed this results in a reverse "bump" to the clutch shaft which helps to stop its forward motion.

Assuming now that the aperture 60h (Figure 17) has crept so far ahead of the point of registry as to place reversing switch 81a on rise 72 of cam 71 when photo-tube 65 is energized. In this event switch 81 will remain open and, due to the reversing action of relay 109a, will become the "stop" switch while switch 80 will become the "start" switch. After the aperture has served to energize photo-cell 65 to initiate the reversing action, it will move on to energize photo-cell 64 at which time switch 80 will be on the rise of the cam (since the web is creeping ahead of its proper position). This will energize relay 103 to close contacts 105 and 107. This completes the circuit to coil 135 and hence energizes relay 121a to close contacts 179 and 191 which forms a holding circuit for relay 121a through contacts 131 and 132 of relay 115 and contacts 181 and 192 of relay 183. In this connection, it will be remembered that the reversing relay 183 will have been energized by relay 109a by reason of switch 81a being closed when photo-tube 65 was energized. The energizing of relay 121a causes contact 188 and 189 to close, thereby completing through contacts 117 and 118 the circuit to the "reversing" or retarding clutch and signal light 193, which is the reverse signal light.

When the retarding action of the reverse clutch has brought the web back into registry so that the switch 81 (which is now the "stop" switch) is on cam rise 72 when phototube 65 is energized, the completed circuit to coil 126 of relay 109 will close contact 108 and 128, thereby energizing relay 115. At the same time contacts 108 and 111 of relay 109 will have been opened, thereby breaking the holding circuit to relay 183 which, in turn, opens contacts 181 and 192, thereby breaking the holding circuit to relay 121a. The opening of contacts 117 and 118 of relay 115 and the opening of contacts 188 and 189 of relay 121a will break the circuit to the "reverse" or retarding clutch. At the same time contacts 114 and 118 of relay 115 will be closed, as will be contacts 189 and 190 of relay 121a, thereby momentarily energizing the "forward" or "advanced" clutch, giving a "bump" in the opposite direction.

A holding circuit for relay 115 will have been completed by the closing of contacts 181 and 192 of relay 183, and the aperture must advance to light source 62 to energize photo-cell 64 when switch 80 is on cam rise 72, thereby energizing relay 103 and closing contacts 105 and 107 which will energize relay 121a so as to open contacts 189 and 190 to break the forward clutch circuit. After switch 80 drops off rise 72, thereby de-energizing relay 121a, all of the circuits will be in their original positions, ready to accept a signal either to advance or retard the web.

With reference to manual forward-reverse switch 149, it must be understood that when this switch is in "forward" position, all circuits will perform automatically as previously described. When, however, the switch 149 is in the reverse position, the system will operate in the "retarding" direction only.

Modifications may, of course, be made in our invention without departing from the spirit of it, and we do not intend to be limited to the details thereof as various modifications may occur to the skilled worker in the art. Having, however, described our invention in an exemplary embodiment, what we desire to secure and protect by Letters Patent is:

1. In a web feeding device having means to operate on a web of material at a predetermined location with relation to each of a series of apertures in the web, a web feeding means, and variable speed mechanism operatively connected to said web feeding means for selectively altering the feeding speed of said web, compensating means for maintaining the apertures in said web in proper registry with said operating means, said compensating means comprising a selector having a pair of control switches, means for sequentially opening and closing said control switches in predetermined timed relation to the movement of said operating means, one of said control switches comprising a part of a starting circuit for actuating said variable speed mechanism and the other of said control switches comprising a part of a circuit for stopping said variable speed mechanism, and a detector having a first sensing means forming a part of the starting circuit and acting through the apertures in the web to complete the starting circuit when the said apertures assume an abnormal position with respect to said operating means and said first named switch is closed, and a second sensing means forming a part of the stopping circuit and acting through the apertures in the web to complete the stopping circuit when the said apertures reassume their proper position relative to said operating means and said other control switch is closed.

2. In a web feeding device having means to operate on a web of material at a predetermined location with respect to each of a series of apertures in the web, a web feeding means, and variable speed mechanism operatively connected to said web feeding means for selectively altering the feeding speed of said web, compensating means for maintaining the apertures in said web in proper registry with said operating means, said compensating means comprising a selector having a rotating member driven in timed relation to said operating means, a plurality of control switches positioned to be sequentially opened and closed by said rotating member, the first of said control switches comprising a part of a starting circuit for actuating said variable speed mechanism, and the second of said control switches comprising a part of a circuit for stopping the said variable speed mechanism, and a detector having a first sensing means acting through the apertures in the web of material to complete the starting circuit when the said apertures assume an abnormal position with respect to said operating means and said first control switch has been closed by said rotating member, and a second sensing means acting through the apertures in the web to complete the stopping circuit when the said apertures reassume their proper position and said rotating member has closed said second control switch.

3. The device claimed in claim 2 wherein means are provided for reversing the direction in which said variable speed mechanism is driven, and wherein means are provided for reversing the circuits between said control switches and said variable speed mechanism.

4. The device claimed in claim 3 wherein said starting and stopping circuits each include holding means for maintaining the said circuits, once completed, until the completion of the other of the circuits, whereupon the first completed circuit is interrupted.

5. In a web feeding device having an operating means for acting upon a web of material at a predetermined location with respect to each of a series of apertures in said web, a web feeding means, and variable speed mechanism operatively connected to said web feeding means for selectively altering the feeding speed of said web, compensating means for maintaining the apertures in the web in proper registry with said operating means, said compensating means comprising a selector having a rotating disk driven in timed relation to said operating means to make one revolution during each operating cycle of said operating means, a pair of control switches positioned to be sequentially opened and closed by said rotating disk during each revolution thereof, a first of said control switches comprising a part of a starting circuit for actuating said variable speed mechanism, and the second of said control switches comprising a part of a circuit for stopping said variable speed mechanism, and a detector having a first sensing means including a light source acting through the apertures in the web to energize a photoelectric cell effective, when energized, to complete the starting circuit when the apertures in the web assume an abnormal position with respect to said operating means and said first control switch is closed by said rotating disk, and a second sensing means including a second light source acting through the apertures in the web to energize a second photoelectric cell effective, when energized, to complete the stopping circuit when the apertures reassume their proper position and said second control switch is closed by said rotating disk.

6. In a web feeding device having an operating means for acting upon a web of material at a predetermined location with relation to each of a series of apertures in the web, a web feeding means, and variable speed mechanism operatively connected to said web feeding means for selectively altering the feeding speed of said web, compensating means for maintaining the apertures in the web in proper registry with said operating means, said compensating means comprising a rotating disk driven in timed relation to said operating means to make one revolution during each operating cycle of said operating means, a pair of spaced apart control switches positioned to be sequentially opened and closed by said disk in timed relation during each revolution thereof, means mounting one of said control switches for movement relative to the other of said control switches to vary the distance between them and thereby vary the time interval between the sequential opening and closing of the said switches, said movable switch comprising a part of a starting circuit for actuating the said variable speed mechanism, and the other of said control switches being fixedly mounted to a support other than said disk and comprising a part of a circuit for stopping the said variable speed mechanism, and a detector having a first sensing means acting through the said apertures in the web to complete the starting circuit when the apertures assume an abnormal position relative to said operating means and said movable control switch is concurrently closed by said rotating disk, and a second sensing means acting through the apertures in the web to complete the stopping circuit when the apertures reassume their proper position relative to said operating means and said other control switch is concurrently closed by said rotating disk.

7. The device claimed in claim 6 wherein the means mounting said movable switch comprises an adjustable arm, wherein an indicating means is operatively connected to said adjustable arm, said indicating means including a calibrated scale, and wherein means are provided for selectively adjusting the position of said movable arm in accordance with the distance between adjacent apertures in the web.

8. The device claimed in claim 7 wherein said switches each include an actuating arm mounting a cam roller positioned to contact the periphery of the rotating disk, and wherein said disk has a raised portion for deflecting said cam rollers to thereby close said switches.

9. In a web feeding device having an operating means for acting upon a web of material at a predetermined location with relation to each of a series of apertures in the web, a web feeding means, and a variable speed mechanism operatively connected to said web feeding means for selectively controlling the feeding speed of the web, compensating means for maintaining the apertures in the web in proper registry with the operating means, said compensating means comprising a selector having a pair of rotating disks driven in timed relation to said operating means to make one revolution during each operating cycle of said operating means, a first control switch positioned to be opened and closed by one of said disks during each revolution thereof, said first control switch comprising a part of a starting circuit for actuating said variable speed mechanism, a second control switch positioned to be opened and closed by the other of said disks during each revolution thereof in predetermined timed relation to the opening and closing of said first control switch, said second control switch comprising a part of a circuit for stopping the variable speed mechanism, and a detector having a first sensing means acting through the apertures in the web to complete the starting circuit when the apertures assume an abnormal position with respect to said operating means and said first named switch is concurrently closed, and a second sensing means acting through the apertures in the web to complete the stopping circuit when the apertures reassume their proper position relative to said operating means and said second switch is concurrently closed.

10. The device claimed in claim 9 wherein means are provided to adjustably mount said first named control switch, whereby to alter the relative positions of said control switches and thereby vary the time interval between the opening and closing of said two switches.

11. The device claimed in claim 10 wherein said control switches each include an actuating arm mounting a cam roller positioned to contact the periphery of one of said disks, wherein each of said disks has a raised portion on the periphery thereof for closing the switch contacted thereby, and wherein said disks are fixed against rotation relative to each other.

12. In a web feeding device having an operating means for acting upon a web of material at a predetermined location with relation to each of a series of apertures in the web, a web feeding means, and a variable speed mechanism operatively connected to said web feeding means for controlling the feeding speed of the web, compensating means for maintaining the apertures in the web in proper registry with respect to said operating means, said compensating means comprising a selector having a pair of control switches, means for sequentially opening and closing said control switches in timed relation to the movement of said operating means, one of said control switches comprising a part of a starting circuit for actuating said variable speed mechanism, and the other of said control switches comprising a part of a circuit for deactivating said variable speed mechanism, and a detector comprising a pair of photoelectric cells positioned on one side of the moving web, a coacting pair of light sources on the opposite side of the web to energize the photoelectric cells through the apertures in the web, one of the said photoelectric cells acting, upon being energized, to complete the starting circuit when the apertures in the web assume an abnormal position with respect to said operating means and the control switch forming a part of said starting circuit is concurrently closed, the other of said photoelectric cells acting, upon being energized, to complete the stopping circuit when the apertures reassume their proper position with respect to said operating means and the other of said control switches is concurrently closed.

13. In a web feeding machine having an operating means for acting upon a web of sheet material at a predetermined location with relation to each of a series of apertures in the web, web feeding means, and variable speed mechanism operatively connected to the web feeding means for selectively altering the feeding speed of the web, compensating means for maintaining the apertures in the web in proper registry with respect to said operating means, said compensating means comprising a selector mounting a plurality of control switches, means to sequentially open and close said control switches in timed relation to the movement of said operating means, a first of said control switches comprising a part of a starting circuit for actuating said variable speed mechanism to accelerate the feeding speed of the web, a second of said control switches comprising a part of a circuit for stopping said variable speed mechanism, and a third of said switches comprising a part of a circuit for actuating said variable speed mechanism to retard the feeding speed of the said web, and a detector acting through the apertures in the web to complete said circuits in accordance with the position of the apertures in the web relative to said operating means, said detector having a first detecting means forming a part of said starting circuit and coacting with said first named control switch to complete said starting circuit when said first named control switch is closed and the apertures on the web have assumed an abnormally retarded position relative to said operating means, and a second detecting means forming a part of said stopping circuit and coacting with the second of said control switches to complete said stopping circuit when said last named control switch is closed and the apertures in the web have returned to their proper position, said first named detecting means also forming a part of the circuit for actuating said variable speed mechanism to retard the speed of said web when said third control switch is closed.

14. In a web feeding device having an operating means for acting upon a web of material at a predetermined location with relation to each of a series of apertures in the web, web feeding means, and variable speed mechanism operatively connected to said web feeding means for selectively advancing and retarding the feeding speed of the web, compensating means for maintaining the apertures in the web in proper registry with respect to said operating means, said compensating means comprising a selector mounting a plurality of control switches, means for opening and closing said control switches in timed relation to the movement of said operating means, a first of said switches comprising a part of a starting circuit for actuating said variable speed mechanism, and the second of said switches comprising a part of a circuit for stopping said variable speed mechanism, a detector acting through the apertures in the web to complete the said circuits in accordance with the position of the apertures in the web relative to said operating means, said detector having a first detecting means forming a part of said starting circuit and coacting with said first control switch to complete said starting circuit when said switch is closed and the apertures in the web have assumed an abnormal position relative to said operating means, and a second detecting means forming a part of said stopping circuit and coacting with the second of said control switches to complete said stopping circuit when said second switch is closed and the apertures in the web have returned to the proper operating position, and means for varying the time interval between the opening of said second switch and the closing of said first switch, whereby to readily accommodate said device to webs in which the apertures are spaced apart by different unit lengths.

15. In a web feeding machine having an operating means for acting upon a web of material at a predetermined location with relation to each of a series of imprints on the web, a web feeding means, and variable speed mechanism operatively connected to said web feeding means for controlling the feeding speed of the web, compensating means for maintaining the imprints on the web in proper position with respect to said operating means, said compensating means comprising a selector having a housing, a shaft rotatably journaled in said housing, a disk rotatably mounted on said shaft, means for rotating said disk in timed relation to the movement of said operating means, a pair of control switches mounted within said housing each having a cam follower which contacts the periphery of said disk, said disk having a raised portion extending along the periphery thereof for sequentially closing and opening said switches, one of said switches comprising a part of a starting circuit for actuating the said variable speed mechanism controlling the feeding speed of the web and the other of said switches comprising a part of a circuit for stopping the variable speed mechanism, one of said switches being movably mounted within the housing, said movably mounted switch having indicating means associated therewith including a calibrated scale, whereby the position of the movable switch may be set in accordance with the indicia on the scale, and a detector having a first sensing means forming a part of said starting circuit and responsive to the position of the imprints on the web relative to said operating means to complete the starting circuit when the imprints on the web assume an abnormal position and said first named switch is closed, and a second sensing means forming part of a stopping circuit and responsive to the position of the imprints on the web relative to said operating means to complete the stopping circuit when the imprints reassume their proper position and said other switch is closed.

References Cited in the file of this patent
UNITED STATES PATENTS

| | | |
|---|---|---|
| 2,038,452 | Sharkey et al. | Apr. 21, 1936 |
| 2,249,190 | Thompson | July 15, 1941 |
| 2,576,529 | McKenney et al. | Nov. 27, 1951 |
| 2,673,258 | Gallagher et al. | Mar. 23, 1954 |
| 2,702,322 | Truesdell | Feb. 15, 1955 |
| 2,768,827 | Noble | Oct. 30, 1956 |
| 2,812,938 | Haskin et al. | Nov. 12, 1957 |